United States Patent [19]

Schaaf et al.

[11] 4,360,067

[45] Nov. 23, 1982

[54] TRANSPORT LOCK SYSTEM FOR AN IMPLEMENT OR THE LIKE

[75] Inventors: Wayne J. Schaaf; Bennie J. Boswell, both of Kewanee, Ill.

[73] Assignee: Chromalloy American Corporation, St. Louis, Mo.

[21] Appl. No.: 252,851

[22] Filed: Apr. 10, 1981

[51] Int. Cl.³ .............................................. A01B 63/22
[52] U.S. Cl. ..................................... 172/413; 172/466
[58] Field of Search ................. 172/466, 316, 315, 413

[56] References Cited

U.S. PATENT DOCUMENTS

| | | | |
|---|---|---|---|
| 2,553,315 | 5/1951 | Hansen | 97/47 |
| 2,592,841 | 4/1952 | Acton | 56/27 |
| 2,606,414 | 8/1952 | Dyrr | 172/316 X |
| 2,606,532 | 8/1952 | Ziskal | 172/413 X |
| 2,669,818 | 2/1954 | Pursche | 172/413 X |
| 2,871,960 | 2/1959 | Smith | 172/316 X |
| 4,073,345 | 2/1978 | Miller | 172/413 |

Primary Examiner—Richard J. Johnson
Attorney, Agent, or Firm—Haverstock, Garrett & Roberts

[57] ABSTRACT

A transport lock system for an implement or the like having a frame and transport wheels movable between lowered transport positions wherein the frame is raised for transport and raised positions wherein the frame and ground working tools thereon are lowered for an operating mode, and having a fluid pressure operated cylinder operative to move the transport wheels between their raised and lowered positions. The transport lock system includes a lock link and locking pin which are selectively cooperable to prevent an operator from lowering the frame during a transport mode and includes a flow control valve operative in response to movement of the locking pin to a locking position to prevent the operator from inadvertently applying fluid pressure to the cylinder in a manner to lower the frame. The control valve is operative in response to movement of the locking pin to a non-locking position to enable actuation of the cylinder to raise and lower the frame. An operator control lever enables the operator to urge the locking pin to a selected position but actual change in position is prevented unless predetermined movement of the transport wheels is first effected.

8 Claims, 12 Drawing Figures

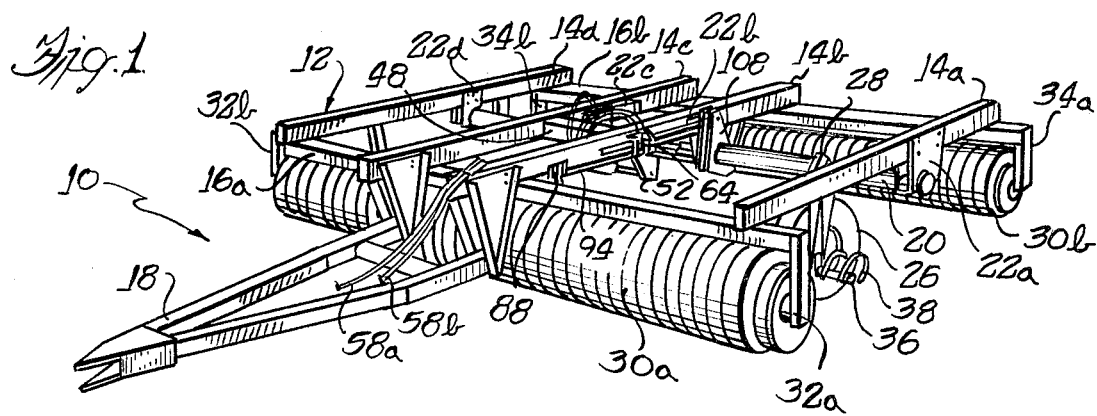
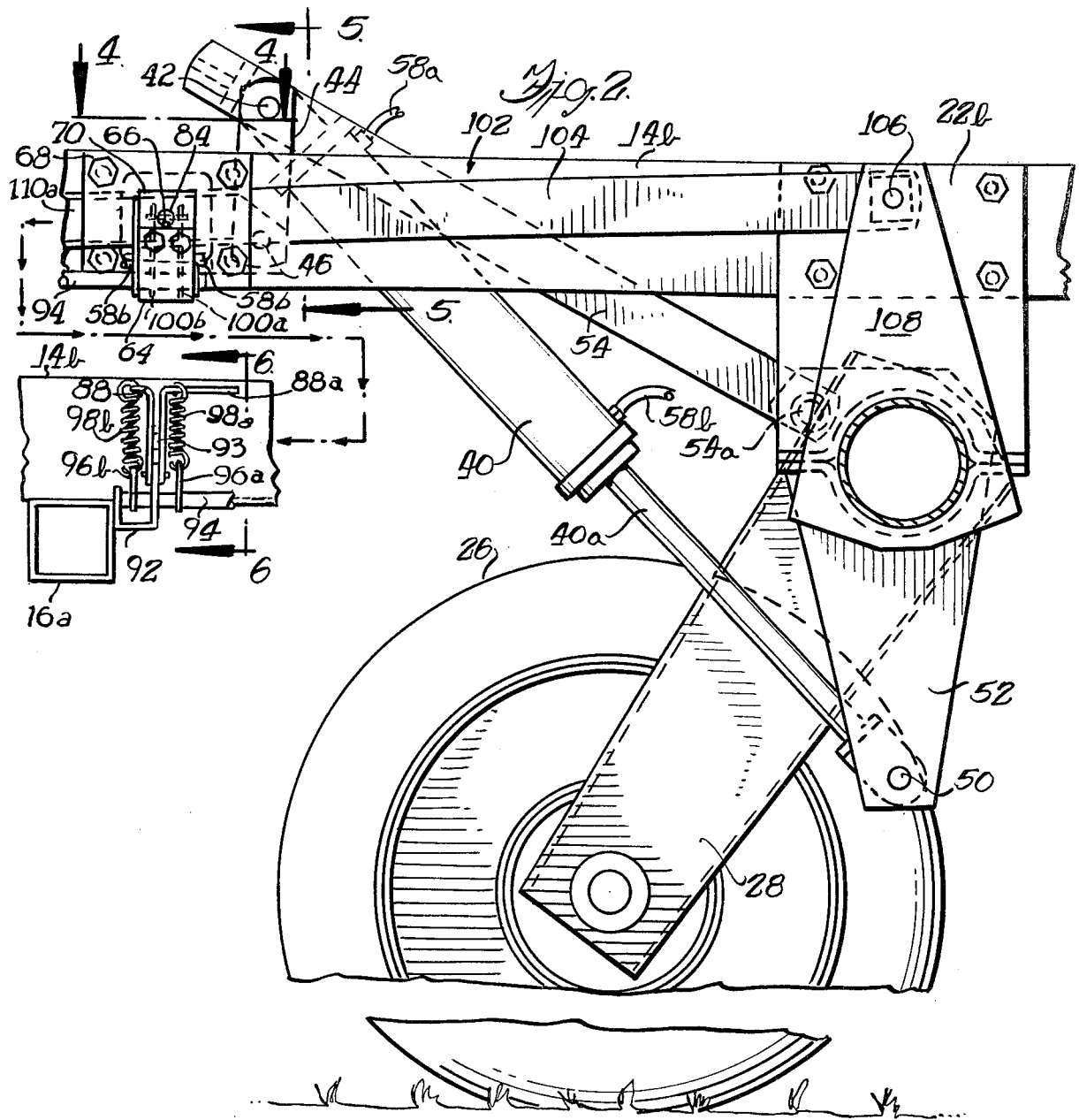

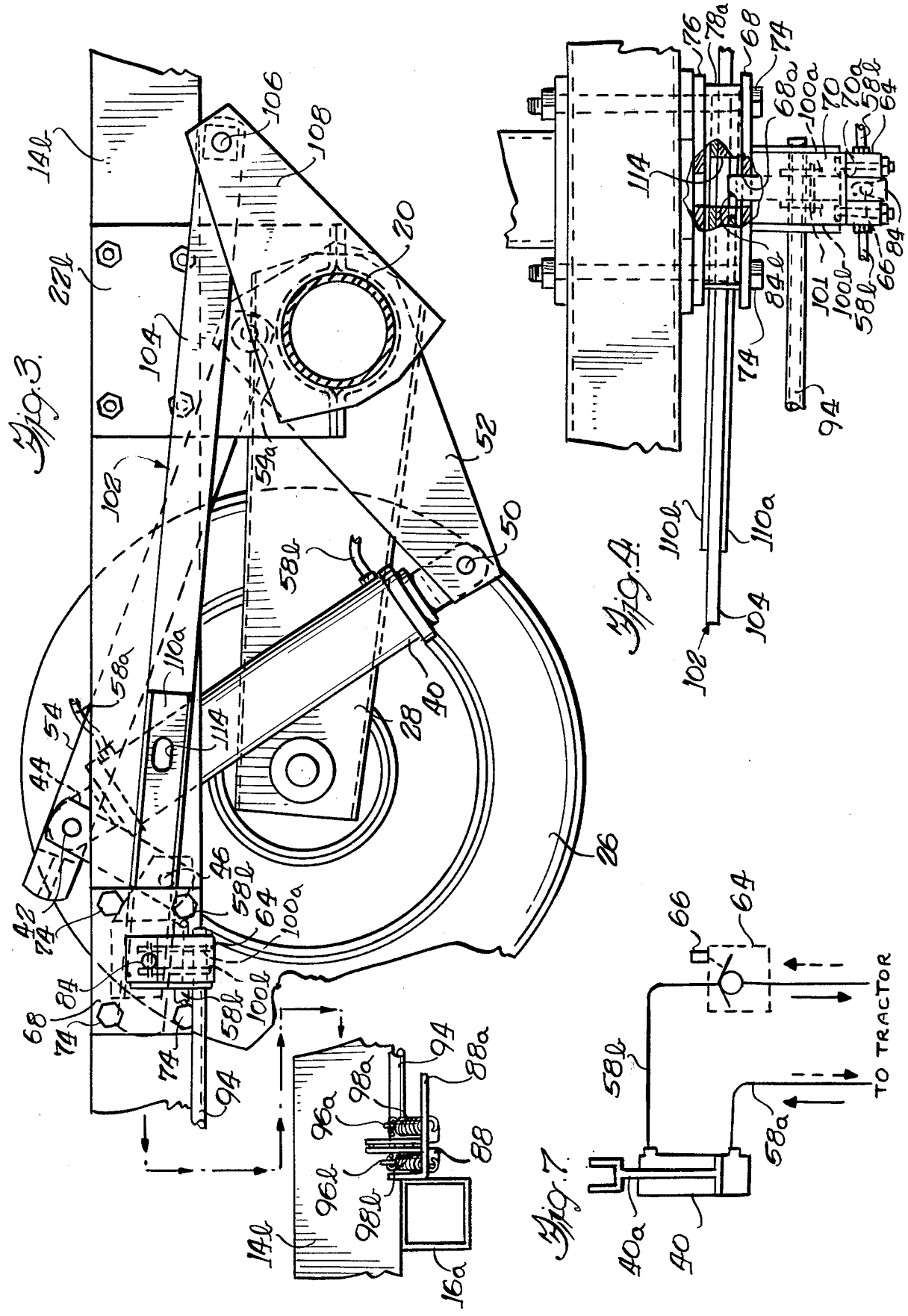

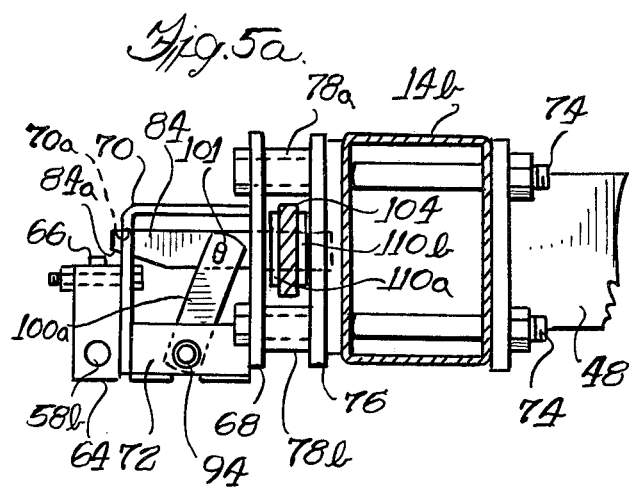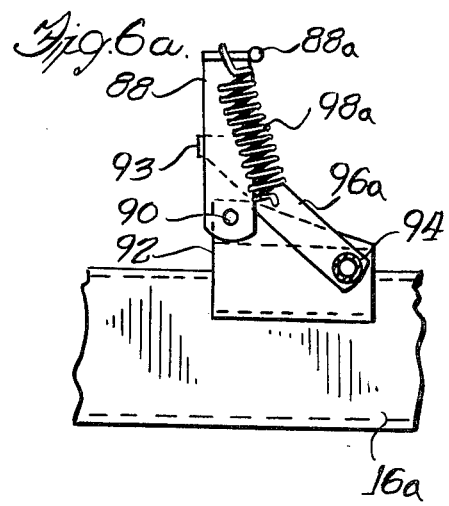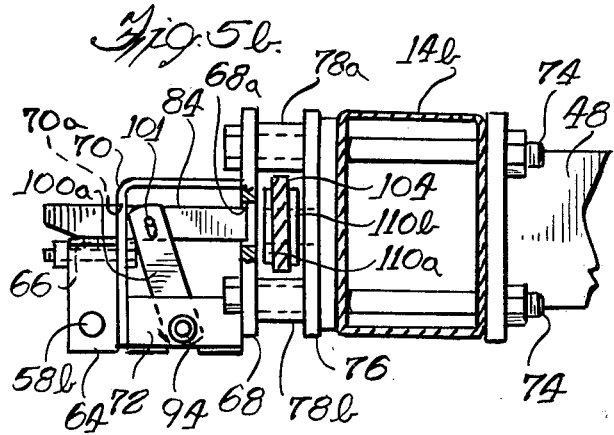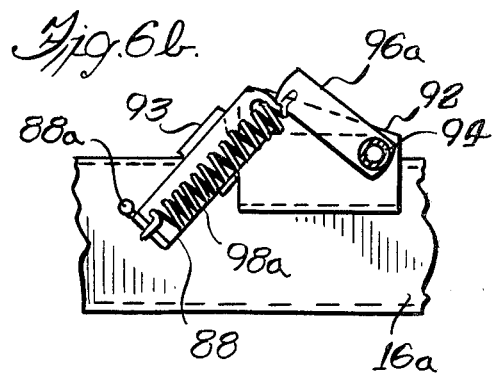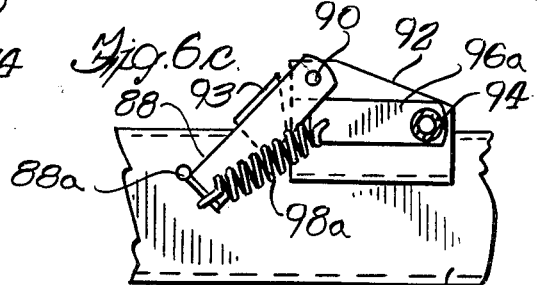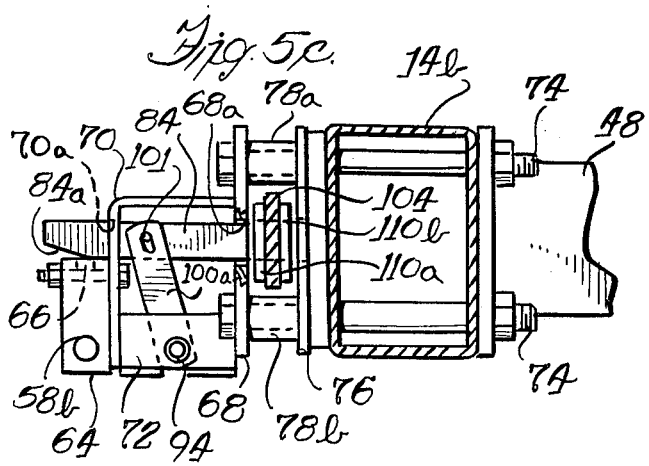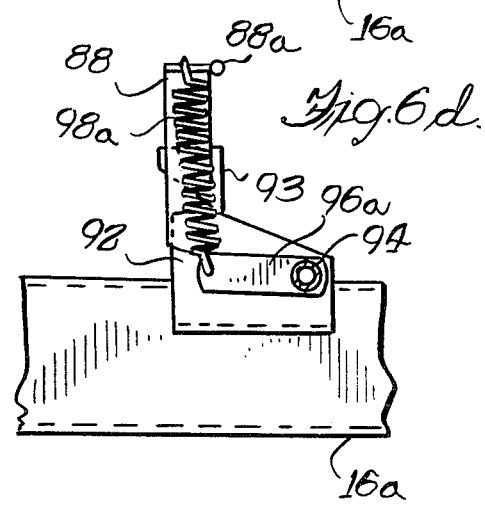

TRANSPORT LOCK SYSTEM FOR AN IMPLEMENT OR THE LIKE

The present invention relates generally to implements and the like having a frame and transport wheels movable to raise the frame for transport and lower the frame for an operating mode, and relates more particularly to a novel transport lock system for such an implement which prevents inadvertent lowering of the frame during transport.

It is a common practice with many types of implements, and particularly agricultural implements which have a frame carrying ground working tools thereon, to provide transport wheels which are movable between lowered transport positions maintaining the frame and associated ground working tools in a raised condition for transport, and raised positions wherein the frame and ground working tools are lowered for ground working operation. With the advent of fluid pressure systems on implements and associated draft vehicles which enable the use of fluid pressure operated cylinders, it is common to employ fluid pressure cylinders on such implements to move or actuate the transport wheels between lowered transport positions and raised operating positions. Conventionally, the fluid pressure lines for the actuating cylinders are connected to a source of fluid pressure on the draft vehicle, generally a tractor, through a main control valve by which the operator can control raising or lowering of the implement frame.

The need to prevent inadvertent lowering of the frame and ground working tools during transport is self evident, and has been satisfied in a relatively simple manner in at least one prior implement by providing a lock pin which is releasably inserted through aligned openings in a rock arm fixed on a wheel supporting rockshaft and a bracket fixed to the implement frame when the wheels are in lowered positions. See, for example, U.S. Pat. No. 3,006,422. While the use of locking pins to prevent lowering of an implement frame and associated ground working tools may be satisfactory in smaller size implements which employ relatively small size fluid pressure operated cylinders, recent increases in implement size have been accompanied by larger size fluid pressure cylinders or rams which, if energized to raise the transport wheels when they are mechanically locked in their lowered positions, can lead to bending of the rockshaft, shearing of the lock pin, and/or damage to other components. Accordingly, it is highly desirable in wheeled implements employing fluid pressure operated wheel actuating cylinders to provide means which prevents the operator from inadvertently pressurizing the cylinder in a manner to lower the implement frame and associated ground working tools when they are mechanically locked in lowered positions during a transport mode.

A general object of the present invention is to provide a novel transport lock system for use with an implement or the like having a frame and transport wheels movable to raise the frame for transport and lower the frame for other operation, which system is adapted to prevent inadvertent lowering of the frame during a transport mode.

A more particular object of the present invention is to provide a novel transport lock system for an implement having a frame and transport wheels movable between first lowered positions wherein the frame is raised for a transport mode and second raised positions wherein the frame is lowered for an operating mode, and having a fluid pressure operated cylinder operative to move the transport wheels between their lowered and raised positions, the transport lock system employing a locking pin selectively cooperable with a lock link to prevent lowering of the frame during a transport mode, and including a flow control valve connected in the fluid pressure line to the cylinder and being conditioned in response to the position of the locking pin to prevent the operator from inadvertently pressurizing the cylinder during a transport mode in a manner which would lower the implement frame, but enabling the operator to selectively pressurize the cylinder when the locking pin is in a non-locking position.

A feature of the transport lock system in accordance with the present invention lies in the provision of a control linkage mounted on the implement frame for access by an operator at the forward end of the frame and adapted to selectively urge the lock pin between its locking and non-locking positions, and a transport lock link operatively associated with the transport wheels and operative to prevent movement of the locking pin from its locking to its non-locking positions until the operator has first intentionally slightly lowered the transport wheels relative to the frame, thereby preventing the operator from inadvertently pressurizing the cylinder in a manner which would lower the implement frame during a transport mode.

Further objects and advantages of the present invention, together with the organization and manner of operation thereof will become apparent from the following detailed description of the invention when taken in conjunction with the accompanying drawings wherein like reference numerals designate like elements throughout the several views, and wherein:

FIG. 1 is a perspective view of an agricultural implement employing a transport lock system in accordance with the present invention;

FIG. 2 is a fragmentary longitudinal sectional view of the implement of FIG. 1 with the transport wheels in lowered transport positions;

FIG. 3 is a fragmentary longitudinal sectional view similar to FIG. 2 but showing the various elements when transport wheels are in raised positions relative to the implement frame;

FIG. 4 is a fragmentary plan view, on an enlarged scale, taken substantially along the line 4—4 of FIG. 2 looking in the direction of the arrows and with portions broken away for clarity;

FIGS. 5a–5c illustrate the transport lock system flow control valve and associated locking pin in various stages of operation as taken along line 5—5 of FIG. 2;

FIGS. 6a–6d illustrate the transport lock system actuating lever and associated control links in various stages of operation as viewed along line 6—6 of FIG. 2; and FIG. 7 is a schematic circuit diagram illustrating the transport wheel actuating cylinder in circuit with the transport lock flow control valve.

Referring now to the drawings, and in particular to FIG. 1, taken in conjunction with FIGS. 2 and 3, the present invention is illustrated, by way of example, embodied in an agricultural implement, indicated generally at 10. In the illustrated embodiment, the agricultural implement 10 comprises a mulcher adapted to prepare seedbeds for planting although, as will become more apparent hereinbelow, the present invention may be employed in other types of implements. The mulcher 10 includes frame means, indicated generally at 12, in the form of a framework having longitudinally extending frame members 14a–d to which are affixed a forward transverse frame member 16a and a rear transverse frame member 16b so as to establish a generally rectangular shaped framework. A hitch bar or tongue 18 is pivotally connected to the forward ends of the longitudinal frame members 14b,c for pivotal movement in a generally vertical plane about a pivot axis transverse to the longitudinal axis of the implement frame. The hitch bar 18 facilitates connection of the implement to a draft vehicle, such as a tractor, for pulling the implement during both transport and field working operation.

A tubular cylindrical rockshaft 20 is mounted on the frame means 12 through mounting brackets 22a–d which are affixed to and depend downwardly from the longitudinal frame members 14a–d, respectively, so that the rockshaft extends transversely of the implement frame means and is journaled on the mounting brackets 22a–d for rotation about its longitudinal axis. Transport wheel means in the form of a pair of laterally spaced transport wheels, one of which is shown at 26, are mounted on radial support arms, one of which is shown at 28, fixed on the rockshaft 20.

The frame means 12 carries ground working tools thereon which, in the illustrated mulcher, comprise forward and rear gangs of rotatable rollers or sprocket wheels 30a and 30b journaled on the lower ends of depending support brackets 32a,b and 34a,b affixed, respectively, to the transverse frame members 16a,b. Transverse rock bars, one of which is shown at 36 in FIG. 1, may be mounted on the frame means 12 so as to lie between the forward and rear roller gangs 30a and 30b in generally parallel relation therewith. The rock bars carry laterally spaced spring shanks or teeth such as indicated at 38, and may be selectively rotated about their longitudinal axes in a known manner to effect ground working by the spring teeth 38 when the frame means is lowered.

The transport wheels 26 are adapted to be moved between first lowered transport positions, as shown in FIGS. 1 and 2, wherein the frame means 12 and associated ground working tools are raised above ground level for transport, and second raised positions wherein the frame means and associated ground working tools are lowered for ground working operation, as shown in FIG. 3. To effect such movement of the transport wheels between their lowered and raised positions, the implement 10 includes actuating means in the form of a fluid pressure operated double acting cylinder or ram 40 having its cylinder end pivotally connected at 42 to one end of a connecting link 44 which is pivotally connected at 46 to a transverse frame member 48 fixed between the longitudinal frame members 14b and 14c, as illustrated in FIGS. 1 and 2. The cylinder 40 has the outer end of its extendable piston rod 40a pivotally connected at 50 to a radial arm 52 fixed to the rockshaft 20 in transverse relation thereto. A link 54 has its opposite ends pivotally connected, respectively, at 54a to the radial arm 52 and to the pivot axis 42 on the connecting link 44. While the implement 10 is illustrated with a single wheel actuating cylinder 40, it will be appreciated that more than one wheel actuating cylinder may be employed if desired.

The cylinder or ram 40 is connected in a fluid pressure circuit through fluid pressure flow lines 58a and 58b which are connected, respectively, through suitable fittings to the piston end and the rod end of the cylinder. The fluid pressure lines 58a,b extend forwardly of the implement for connection to a suitable source of fluid pressure (not shown) such as a hydraulic pump and associated reservoir normally found on conventional tractors and other draft vehicles used to pull such implements. The fluid pressure lines are connected to the fluid pressure source through a conventional main tractor mounted fluid pressure control valve which enables the operator to select a desired actuating mode for the cylinder 40 so as to normally extend and retract the piston rod 40a. Pressurizing the piston end of the cylinder 40 through line 58a with the rod end allowed to exhaust extends the piston 40a and moves the transport wheels 26 to their lowered transport positions to raise the implement frame and associated ground working tools above ground level for transport, while pressurizing the rod end of the cylinder through pressure line 58b with the piston end allowed to exhaust retracts the piston rod to raise the transport wheels with a corresponding lowering of the implement frame and ground working tools to ground working positions as shown in FIG. 3.

In accordance with the present invention, the implement 10 is provided with a transport lock system which prevents the operator from inadvertently pressurizing the rod end of the cylinder 40 in a manner to attempt lowering of the frame when the transport wheels 26 are in their lowered transport positions, and also provides means to selectively interlock the transport wheels to the frame so as to prevent inadvertent or accidental lowering of the frame and associated ground working tools. The transport lock system includes control valve means in the form of a flow control valve 64. The control valve 64 comprises a check valve of conventional design having an outwardly biased valve actuator or manual override button 66. The flow control valve 64, which may be termed the transport lock valve, is mounted on a rectangular mounting plate 68 through an L-shaped bracket 70 and a mounting block 72 so as to be spaced from the mounting plate 68 as illustrated in FIGS. 5a–c. The mounting plate 68 is, in turn, mounted on the longitudinal frame member 14b through bolts 74 so as to be maintained in parallel spaced relation from a similarly shaped plate 76 by rectangular spacer blocks 78a,b.

The control valve 64 is connected in the fluid pressure line 58b between the rod end of the cylinder or ram 40 and the main operator control valve and associated source of fluid pressure carried on the draft vehicle. In a first operating condition, the valve actuator or override button 66 is biased to an outwardly extending position which conditions the transport lock control valve 64 for unidirectional flow so as to prevent fluid pressure flow from the fluid pressure source through line 58b to the cylinder 40 in a manner to retract the piston 40a, while allowing fluid pressure flow from the rod end of the cylinder when the piston end is pressurized. Thus, with the valve actuator button 66 in its outwardly biased position, the operator is prevented from pressurizing the cylinder 40 in a manner which would move the transport wheels from their lowered transport positions to raised positions lowering the frame means 12 and associated ground working tools for ground engagement. Conversely, depressing the valve actuator or override button 66 establishes a second actuator position which conditions the control valve 64 for bidirectional flow so as to allow fluid pressure flow from the pressure source through line 58b to the rod end of the cylinder or ram 40, thus enabling the operator to selectively pressurize the cylinder 40 for raising the transport wheels with corresponding lowering of the frame means and associated ground working tools. The operation of the control valve 64 in controlling fluid pressure flow to the rod end of cylinder 40 through line 58b is shown schematically in FIG. 7. If more than one wheel actuating cylinder or ram is employed, the line 58b from the control valve 64 may be connected to the rod ends of all of the cylinders.

The transport lock system of the invention includes actuator means supported by the frame means 12 for operative association with the valve actuator 66 so as to enable selective conditioning of the control valve 64. The actuator means includes locking means in the form of a cylindrical locking pin 84 supported by the frame means 12 for operative association with the valve actuator button 66 so as to be movable between a locking position maintaining the valve actuator button extended to condition the transport lock control valve 64 for unidirectional flow, and a non-locking position depressing the valve actuator button to condition the transport lock control valve for bidirectional fluid pressure flow therethrough. To this end, the locking pin 84 is longitudinally slidable within axially aligned openings 68a and 70a formed, respectively, in the mounting plate 68 and L-shaped bracket 70 so that the axis of the locking pin intersects the longitudinal axis of the valve actuator button 66. The locking pin 84 is illustrated in a locking position in FIG. 5a wherein it is spaced from the valve actuator button 66 to enable the valve actuator button to extend outwardly and thereby condition the control valve 64 to prevent fluid pressure flow to the rod end of cylinder 40. Longitudinal movement of the locking pin 84 in a left-hand direction, as viewed in FIG. 5a, causes an inclined cam surface 84a formed on the locking pin to engage and depress the valve actuator button 66 and condition the transport lock control valve 64 for bidirectional fluid pressure flow therethrough.

The locking pin 84 is adapted to be selectively urged or biased from its locking position to its non-locking position, and vice versa, by the operator through manual control lever means accessible to the operator at the forward end of the vehicle frame. For this purpose, and as illustrated in FIGS. 2 and 6a–d, a transport lock actuating lever 88 is pivotally mounted at 90 on a mounting bracket 92 fixed to the forward transverse frame member 16a adjacent the forward end of the implement frame for ready access by the operator. The actuating lever 88 has a hand grip portion 88a and has a stop member 93 thereon which is adapted to engage bracket 92 so as to limit upward and downward pivotal movement of the actuating lever about its pivot axis 90 between the positions shown in FIGS. 6a and 6b. Actuating lever 88 is interconnected to the forward end of a longitudinally extending rotatably supported control rod 94 through a pair of control levers or links 96a and 96b and associated coil tension springs 98a and 98b, the links 96a,b being fixed on the forward end of rod 94. The rearward end of the control rod 94 has a pair of laterally spaced radial control arms 100a and 100b fixed thereon for movement with the control rod. The outer ends of the control arms 100a,b are pivotally connected to the locking pin 84 through a diametral pin 101 having its outer ends slidingly received through elongated slots formed in the control arms 100a,b.

The relation of the transport lock actuating lever 88, control links 96a,b, springs 98a,b and control arms 100a,b are such that when the control links 96a,b and, correspondingly, the control arms 100a,b and locking pin 84 are in predetermined positions relative to the control valve 64, such as with the locking pin 84 in its locking position spaced from the valve actuator button 66, the actuating lever 88 may be manually moved to a position loading the springs 98a,b to urge the locking pin 84 to its alternate non-locking position depressing actuator button 66.

Transport lock means, indicated generally at 102, are operatively associated with the transport wheels 26 and are adapted for interlocking relation with the locking pin 84 to prevent lowering of the implement frame and ground working tools and also maintain the locking pin in its locking position spaced from valve actuator button 66 against any biasing force applied by springs 98a,b urging the locking pin toward its non-locking position when the transport wheels are in their lowered transport positions. The transport lock means 102 is also operative to prevent movement of the locking pin 84 from its non-locking position depressing the valve actuator 66 to its locking position in opposition to any biasing force applied by the tension springs 98a,b when the transport wheels are in their raised positions which the frame means and associated ground working tools lowered to ground working positions.

With particular reference to FIGS. 2 and 3, taken in conjunction with FIGS. 5a–c, the transport lock means 102 includes an elongated lock link or bar 104 of rectangular cross section having its rearward end pivotally connected at 106 to and between a pair of closely spaced radial arms 108 fixed on the rockshaft 20 generally adjacent the longitudinal frame member 14b. The lock link 104 is longitudinally movable in response to rotation of rockshaft 20 as the transport wheels are raised and lowered, and extends forwardly between the aforementioned plates 68 and 76 so as to slide on the lower spacer block 78b for generally rectilinear movement and lie in the path of movement of the locking pin 84. The portion of the lock link 104 received between plates 68 and 76 may have a pair of generally rectangular bearing pads 110a and 110b affixed to the opposite sides thereof. An elongated opening 114 is formed in the lock link 104 and associated bearing plates 110a,b so as to be axially aligned with and receive the locking pin 84 therethrough when the transport wheels 26 are in their lowered transport positions. Conversely, when the transport wheels are in their raised positions as in FIG. 3, the lock link is disposed in a rearward position so that the opening 114 is spaced from the locking pin 84 and longitudinal movement of the locking pin to its locking position spaced from the valve actuator button 66 is blocked by the lock link until the transport wheels are subsequently moved to their lowered transport positions to again bring the opening 114 into axial alignment with the locking pin 84.

In accordance with one feature of the invention, the locking pin 84 is provided with a beveled cam surface 84b, as illustrated in FIG. 4, on the end of the locking pin opposite the cam surface 84a and lying at approximately 90° about the axis of the locking pin from cam surface 82a. The cam surface 84b is positioned so that, should the locking pin 84 be prevented from freely moving to its full non-locking position by dirt or other foreign material, the center edge of the lock link 104 and associated bearing plate 110a adjacent the forward edge of opening 114 will engage the cam surface 84b and force the locking pin to its non-locked position depressing the valve actuator 66 as the lock link is drawn rearwardly upon raising the transport wheels.

Summarizing the operation of the transport lock system in accordance with the present invention, when the implement 10 is in a transport position with the transport wheels 26 lowered resulting in raising of the frame means 12 and associated ground working tools above ground level for transport, as illustrated in FIG. 2, and assuming the operator has previously conditioned the locking pin 84 so that it is in a locking position extending through the opening 114 in the lock link 104, the reaction forces acting on the transport wheels cause the lock link peripherally of the opening 114 to engage the peripheral surface of the locking pin with sufficient frictional force to prevent it from moving longitudinally to its non-locking position. At this time, the locking pin 84 will be in a position as shown in FIG. 5a preventing movement of the lock link and thus raising of the transport wheels, and the control levers 96a,b will be in a position as shown in FIG. 6a.

With the various elements in positions as thus described, the operator may, either prior to beginning transport of the implement or after reaching a desired destination, manually move the transport lock actuating lever 88 downwardly or counterclockwise about its pivot axis 90 to a position as shown in FIG. 6b. With the lock pin 84 being frictionally retained on its locking position by frictional engagement with the lock link 104, such movement of the actuating lever 88 loads the tension springs 98a,b to urge the locking pin toward its non-locking position but does not actually effect rotational movement of the control rod 94.

When the operator reaches a location where he wishes to raise the transport wheels and thus lower the frame means 12 and associated ground working tools for ground working operation, he must first pressurize the cylinder 40 to extend the piston 40a slightly and move the lock link 104 slightly forwardly so as to release the locking pin 84 which moves to its non-locking position under the action of the loaded springs 98a,b. Since in this condition the flow control valve 64 allows fluid pressure flow from the rod end of cylinder 40, the piston rod 40a may be extended. With the locking pin 84 released, the biasing force applied by the loaded coil springs 98a,b operates to rotate the control links 96a,b and associated control rod 94 and control arms 100a,b to move the locking pin 84 to a non-locking position depressing the valve actuator 66 and enabling fluid pressure flow to the rod end of the cylinder 40 through the transport lock control valve 64 and fluid pressure line 58b, as shown in FIG. 6c. As aforedescribed, should the locking pin 84 be prevented by foreign matter or the like from freely moving to its non-locking position, the cam surface 84b on the locking pin will be engaged by the lock link peripherally of the opening 114 to force the locking pin 84 to its non-locking position. With the valve actuator 66 depressed, the operator may freely raise and lower the transport wheels or, conversely, raise and lower the implement frame relative to ground.

After the operator has lowered the frame means and associated ground working tools, he may manually move the actuating lever 88 from its lowered position as shown in FIG. 6c to its raised transport lock position as shown in FIG. 6d so as to load the springs 98a,b and urge the control levers 96a,b and control arms 100a,b in a clockwise direction, as considered in FIGS. 5c and 6d.

At this time, movement of the locking pin 84 to a locking position is prevented or blocked by the lock link 104.

When the operator energizes the cylinder 40 to lower the transport wheels and raise the frame means and associated ground working tools for transport, the link 104 is moved forwardly to align the opening 114 with the transport pin 84 which, being urged toward its locking position, moves to a locking position within opening 114 and releases the valve control button 66 to condition the control valve 64 for preventing fluid pressure flow to the rod end of the cylinder 40 through the fluid pressure line 58b. In this manner, the transport wheels are locked in their lowered transport positions by the pin 84 and the control valve 64 prevents the operator from inadvertently or accidentally attempting to lower the frame through the main control valve on the draft vehicle when the transport wheels are in their lowered transport positions. This is particularly desirable to prevent pressurizing of the rod end of the wheel actuating cylinder when the transport wheels are mechanically locked to their lowered transport positions so as to prevent bending of the rockshaft, shearing of the lock pin, and/or damage to other components.

While a preferred embodiment of the invention has been illustrated and described, it will be understood that changes and modifications may be made therein without departing from the invention in its broader aspects. Various features of the invention are defined in the following claims.

What is claimed is:

1. In an implement or the like having a frame, transport wheel means mounted on the frame and movable between a lowered transport position wherein the frame is raised for transport and a raised position wherein the frame is lowered for an operating mode, and actuating means including a fluid pressure operated cylinder operatively associated with said transport wheel means and operative to move said wheel means between its said lowered and raised positions upon selective energizing of said cylinder, said cylinder being connected in a fluid pressure control circuit including a source of fluid pressure and operative to supply fluid pressure to said cylinder so as to selectively move said wheel means between its said lowered and raised positions; the combination therewith comprising, control valve means connected in said fluid pressure control circuit and having a valve actuator operative in a first position to condition said control valve means so as to prevent fluid pressure flow to said cylinder in a manner to move said wheel means from its said lowered transport position to its said raised position, said actuator being movable to a second position conditioning said control valve means to allow fluid pressure flow to said cylinder so as to selectively move said transport wheels between its said lowered and raised positions, actuator means supported by said frame for operative association with said valve actuator, said actuator means being movable between a locking condition placing said valve actuator in its said first position, and a non-locking condition placing said valve actuator in its said second position, said actuator means including control lever means supported by said frame and operable to bias said actuator means between its said locking and non-locking conditions, said actuator means further including locking pin means supported by said frame for operative association with said valve actuator, said locking pin being longitudinally movable between a locking position placing said valve actuator in its said first position, and a non-locking position placing said valve actuator in its said second position, transport lock means operatively associated with said wheel means and cooperative with said actuator means to prevent movement thereof from its said locking condition to its said non-locking condition when said wheel means is in its said lowered position, said transport lock means being operative to enable movement of said actuator means from its said locking condition to its said non-locking condition in response to movement of said wheel means to its said raised position, said control lever means including an operating handle mounted adjacent the forward end of said frame, and including resilient means interposed between said operating handle and said locking pin enabling said locking pin to be selectively biased between its said locking and non-locking positions.

2. The combination as defined in claim 1 wherein said operating handle includes an operating lever pivotally mounted on said frame and movable between first and second positions, said resilient means comprising spring means adapted to be placed in a state of potential energy upon selective movement of said operating handle between its said first and second positions while said locking pin is maintained in a constant position relative to said valve actuator.

3. The combination as defined in claim 1 wherein said control valve means comprises a check valve adapted to be placed in a condition enabling only unidirectional flow therethrough when said valve actuator is in its said first position, said check valve being operative to enable bidirectional flow therethrough when said valve actuator is in its said second position.

4. The combination as defined in claim 1 wherein said locking pin has a cam surface thereon adapted to be engaged by a lock link so as to force said locking pin from its said locking to its said non-locking position when said locking pin is prevented from undergoing such movement by the bias of said control lever means.

5. The combination as defined in claim 4 wherein said lock link includes an opening, said opening comprising an elongated opening of a size sufficient to receive said locking pin therein when said transport wheels are in first lowered transport position, said opening being further sized so that said lock link peripherally of said opening engages said locking pin in sufficient frictional relation to prevent movement of said locking pin when said wheels are in their said first lowered position but enabling movement of said transport wheels to a second lowered position effecting release of said lock link from said locking pin.

6. The combination as defined in claim 1 wherein said valve actuator comprises an actuating button adapted for longitudinal movement between said first and second positions, said locking pin being supported such that its path of movement intersects the path of movement of said actuating button, said locking pin being cooperative with said actuator button so as to move said actuator button from its said first to its said second positions upon movement of said locking pin from said locking to said non-locking positions.

7. The combination as defined in claim 6 wherein said locking pin has a cam surface formed thereon adapted to engage said actuator button and effect cam actuated movement thereof from its said first to its said second positions as said locking pin is moved from its said locking to its said non-locking positions.

8. The combination as defined in claim 1 wherein said resilient means comprises spring means.

* * * * *